United States Patent
Kimura et al.

(10) Patent No.: US 11,600,941 B2
(45) Date of Patent: Mar. 7, 2023

(54) WIRE HARNESS AND WATERPROOF STRUCTURE

(71) Applicant: Yazaki Corporation, Tokyo (JP)

(72) Inventors: Akitoshi Kimura, Toyota (JP); Satoshi Yokoyama, Toyota (JP); Masayoshi Ogawa, Toyota (JP)

(73) Assignee: YAZAKI CORPORATION, Tokyo (JP)

( * ) Notice: Subject to any disclaimer, the term of this patent is extended or adjusted under 35 U.S.C. 154(b) by 28 days.

(21) Appl. No.: 17/371,780

(22) Filed: Jul. 9, 2021

(65) Prior Publication Data

US 2022/0013951 A1 Jan. 13, 2022

(30) Foreign Application Priority Data

Jul. 10, 2020 (JP) .............................. JP2020-119021

(51) Int. Cl.
| | |
|---|---|
| *H01R 13/52* | (2006.01) |
| *H01R 13/74* | (2006.01) |
| *H01R 13/518* | (2006.01) |

(52) U.S. Cl.
CPC ....... *H01R 13/5202* (2013.01); *H01R 13/518* (2013.01); *H01R 13/74* (2013.01)

(58) Field of Classification Search
CPC .. H01R 13/5202; H01R 13/518; H01R 13/74; H01R 13/5219; H01R 13/6584
See application file for complete search history.

(56) References Cited

U.S. PATENT DOCUMENTS

| | | | | |
|---|---|---|---|---|
| 2,895,003 A | * | 7/1959 | Rapata | H02G 3/0633 16/2.5 |
| 4,493,467 A | * | 1/1985 | Borja | H02G 3/0633 174/153 G |
| 4,568,047 A | * | 2/1986 | Matsui | H02G 3/083 174/153 G |
| 4,892,979 A | * | 1/1990 | Rossow | H01B 17/26 174/153 G |
| 5,487,680 A | * | 1/1996 | Yamanashi | H01R 13/743 439/567 |
| 5,639,993 A | * | 6/1997 | Ideno | B60R 16/0222 174/153 G |

(Continued)

FOREIGN PATENT DOCUMENTS

| | | |
|---|---|---|
| JP | 2008293859 A | 12/2008 |
| JP | 2017-191636 A | 10/2017 |
| JP | 202035680 A | 3/2020 |

*Primary Examiner* — Thanh Tam T Le
(74) *Attorney, Agent, or Firm* — Sughrue Mion, PLLC (57) ABSTRACT

A wire harness includes a connector and a grommet. The connector includes an inner member having an annular plate-shaped flange. The inner member includes a first divided inner part, a second divided inner part, a deformable hinge that connects one end of the first divided inner part and one end of the second divided inner part to each other, and a lock portion that is formed on a fitting portion between the other end of the first divided inner part and the other end of the second divided inner part. The lock portion is formed on a portion where the other end of the first divided inner part and the other end of the second divided inner part are fitted to each other by sliding movement in accordance with a twisting of the hinge about a first axis.

6 Claims, 10 Drawing Sheets

(56) References Cited

U.S. PATENT DOCUMENTS

| | | | | |
|---|---|---|---|---|
| 5,660,564 | A * | 8/1997 | Yamanashi | H01R 13/741 |
| | | | | 439/563 |
| 7,020,931 | B1 * | 4/2006 | Burnett | B60R 16/0222 |
| | | | | 174/152 G |
| 7,418,765 | B2 * | 9/2008 | Kameyama | B60R 16/0222 |
| | | | | 16/2.2 |
| 9,071,007 | B2 * | 6/2015 | Muro | H01R 13/5202 |
| 9,806,454 | B2 * | 10/2017 | Nakai | H01R 13/5205 |
| 9,825,397 | B2 * | 11/2017 | Watai | B60R 16/0222 |
| 10,840,632 | B2 * | 11/2020 | Ogawa | H01R 13/5205 |
| 10,873,151 | B2 * | 12/2020 | Zen | H01R 43/005 |
| 10,899,294 | B2 * | 1/2021 | Kimura | H01R 13/743 |
| 11,018,462 | B2 * | 5/2021 | Akagi | H01R 13/5202 |
| 11,066,024 | B2 * | 7/2021 | Kimura | H02G 3/22 |
| 2020/0070752 | A1 | 3/2020 | Kimura | |

\* cited by examiner

WIRE HARNESS AND WATERPROOF STRUCTURE

CROSS-REFERENCE TO RELATED APPLICATIONS

This application is based on and claims priority under 35 USC 119 from Japanese Patent Application No. 2020-119021 filed on Jul. 10, 2020, the contents of which are incorporated herein by reference.

TECHNICAL FIELD

The present disclosure relates to a wire harness including an inner member having a two-divided structure to which a grommet is assembled, and a waterproof structure.

BACKGROUND ART

Figure 9:
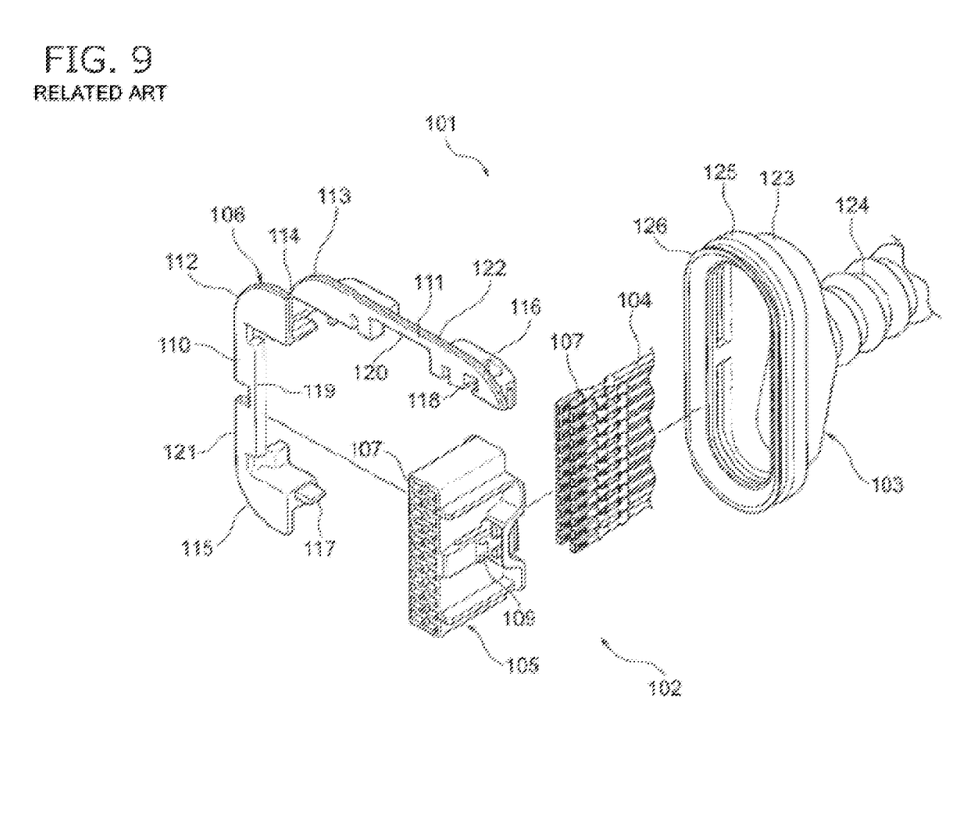
FIG. 9 is an exploded perspective view of a related-art waterproof structure.

JP-A-2017-191636 discloses a related-art waterproof structure provided on a panel of a door portion of an automobile. In FIG. 9, a related-art waterproof structure 101 includes a panel (not shown) having an attachment hole, a connector 102 that is disposed so as to be aligned with the attachment hole, and a grommet 103 that is assembled to the connector 102 and is in close contact with one opening edge portion of the attachment hole.

The connector 102 includes a connector housing 105 from which a plurality of electric wires 104 are drawn out, and an inner member 106 having a two-divided structure surrounding an outer side of the connector housing 105. A plurality of terminal accommodating chambers 108 that accommodate terminal fittings 107 provided at terminals of the electric wires 104 are formed in the connector housing 105. A lock arm 109 is formed on the connector housing 105 as a portion to be fitted to a mating connector (not shown).

The inner member 106 is formed as an annular member as a whole by including a first divided inner part 110 and a second divided inner part 111, a thin hinge 114 that connects one end 112 of the first divided inner part 110 and one end 113 of the second divided inner part 111 to each other, and a first lock portion 117 and a second lock portion 118 that are formed on a fitting portion between the other end 115 of the first divided inner part 110 and the other end 116 of the second divided inner part 111. In the first divided inner part 110 and the second divided inner part 111, a first holding portion 119 and a second holding portion 120 for a first flange 121 and a second flange 122 having an annular plate shape, to which the grommet 103 is assembled, are respectively formed on the first divided inner part 110 and the second divided inner part 111.

The grommet 103 is formed in a tubular shape by including a one end side tubular portion 123, the other end side tubular portion (not shown), and an intermediate tubular portion 124 disposed therebetween. A flange assembly portion 125 is formed at the one end side tubular portion 123 in a concave shape as an attachment portion with the first flange 121 and the second flange 122. A panel close contact portion 126 that is in close contact with the one opening edge portion is formed at the one end side tubular portion 123.

Figures 10A, 10B, 10C:
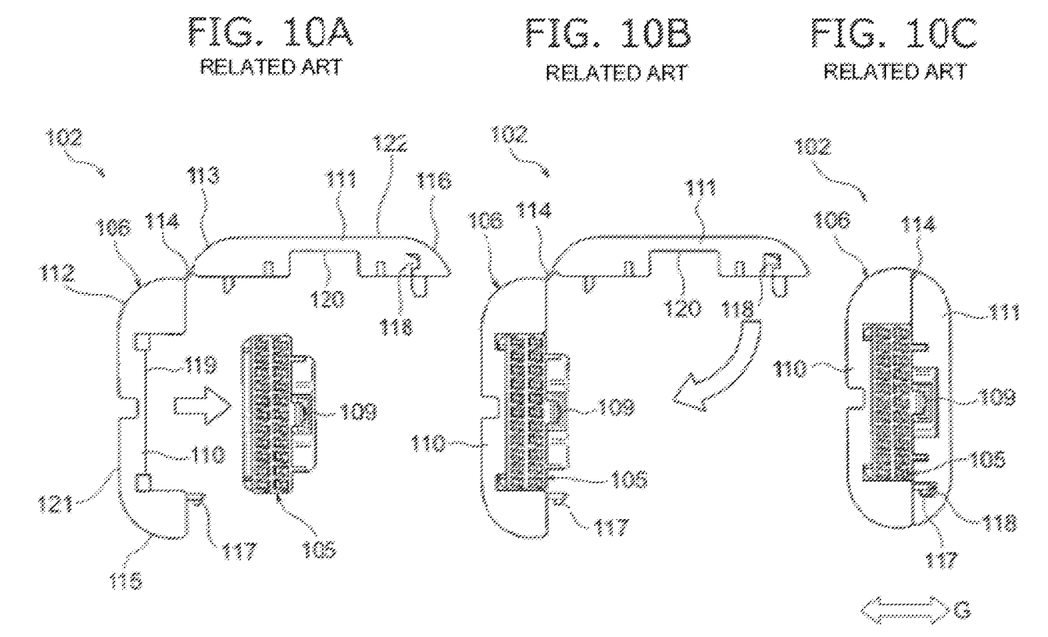
FIGS. 10A to 10C are views showing a state in which an inner member is attached while surrounding an outer side of a connector housing in FIG. 9.

In the above-described configuration and structure, as shown in FIGS. 10A to 10C, the inner member 106 is attached to the connector housing 105 in a state (a closed state) of surrounding the outer side of the connector housing 105 by assembling the first divided inner part 110 such that the connector housing 105 is accommodated in the first holding portion 119, then rotating the second divided inner part 111 about the hinge 114 (an axis of rotation is in a direction perpendicular to a paper surface of FIGS. 10A to 10C), and finally fitting the first lock portion 117 and the second lock portion 118 to each other. In other words, attachment is performed so as to surround the outer side of the connector housing 105. After such attachment, the grommet 103 is assembled to the first flange 121 and the second flange 122 of the inner member 106.

In the related art described above, when the inner member 106 is attached to the connector housing 105, due to a fitting structure of the first lock portion 117 and the second lock portion 118, a fitting backlash occurs in a direction indicated by an arrow G in FIG. 10C. This fitting backlash is such that the other end 115 of the first divided inner part 110 and the other end 116 of the second divided inner part 111 open about the hinge 114, so that occurrence of the fitting backlash may affect a close contact state of the grommet 103 shown in FIG. 9 with the one opening edge portion of the attachment hole.

SUMMARY OF INVENTION

The present disclosure has been made in view of the above circumstances, and an object thereof is to provide a wire harness and a waterproof structure capable of improving waterproof performance.

Aspect of non-limiting embodiments of the present disclosure relates to a wire harness that includes: a connector that is disposed so as to be aligned with an attachment hole of a panel; and a grommet that is assembled to the connector and is in close contact with one opening edge portion of the attachment hole. The connector includes a connector housing from which a plurality of electric wires are drawn out, and an inner member having a two-divided structure that includes an annular plate-shaped flange to which the grommet is assembled, and that is disposed outside the connector housing. The inner member includes a first divided inner part and a second divided inner part, a thin and deformable hinge that connects one end of the first divided inner part and one end of the second divided inner part to each other, and a lock portion that is formed on a fitting portion between the other end of the first divided inner part and the other end of the second divided inner part. When an axis along a connecting direction of the first divided inner part and the second divided inner part by the hinge is defined as a first axis, by twisting the hinge about the first axis, the lock portion is formed on a portion where the other end of the first divided inner part and the other end of the second divided inner part are fitted to each other by sliding movement in accordance with the twisting.

According to the present disclosure, a wire harness and a waterproof structure capable of improving waterproof performance as compared with the related art can be provided.

BRIEF DESCRIPTION OF DRAWINGS

FIGS. 6A and 6B are views corresponding to FIG. 5, in which

DESCRIPTION OF EMBODIMENTS

A wire harness includes a connector that is disposed so as to be aligned with an attachment hole of a panel, and a grommet that is assembled to the connector. The connector includes a connector housing and an inner member having a two-divided structure disposed outside the connector housing. The inner member includes a first divided inner part and a second divided inner part, a thin and deformable hinge that connects one ends of the first divided inner part and the second divided inner part to each other, and a lock portion formed on a fitting portion between the other end of the first divided inner part and the other end of the second divided inner part. By twisting the hinge about a first axis, the lock portion is formed on a portion where the other end of the first divided inner part and the other end of the second divided inner part are fitted to each other by sliding movement in accordance with the twisting.

Embodiment

Figure 1:
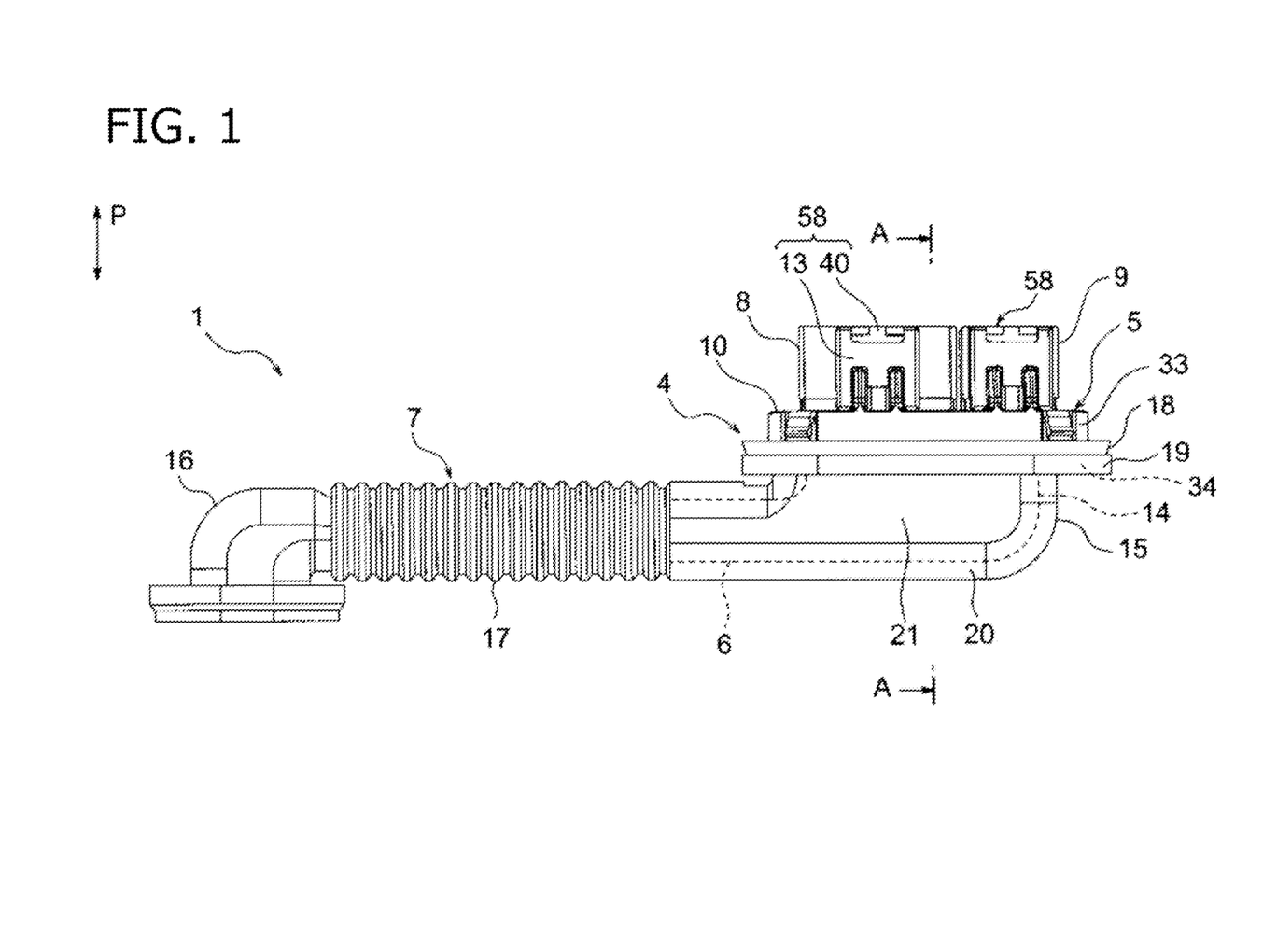
FIG. 1 is an overall view showing an embodiment of a wire harness and a waterproof structure according to the present disclosure.
Figure 2:
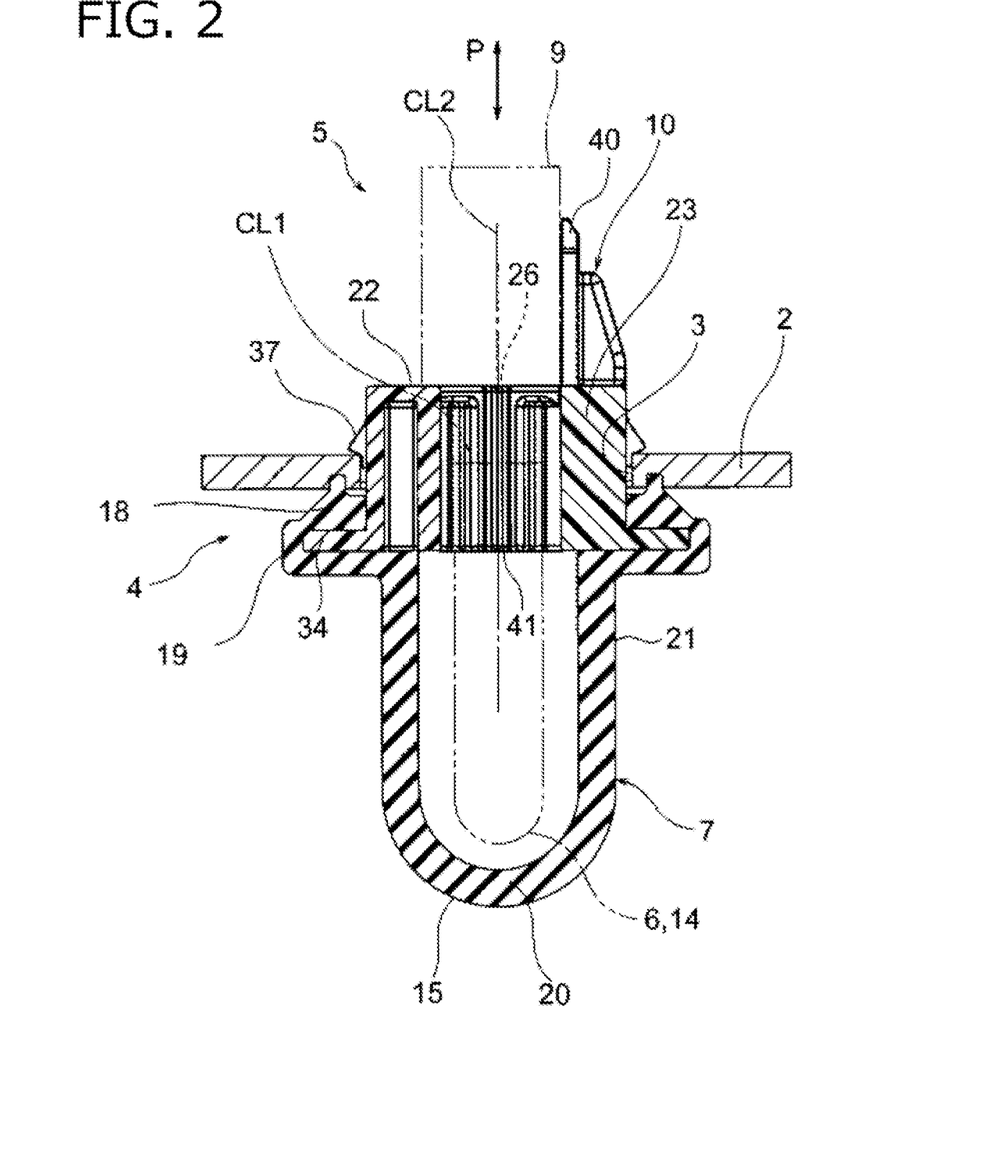
FIG. 2 is a cross-sectional view taken along a line A-A in FIG. 1.
Figure 3:
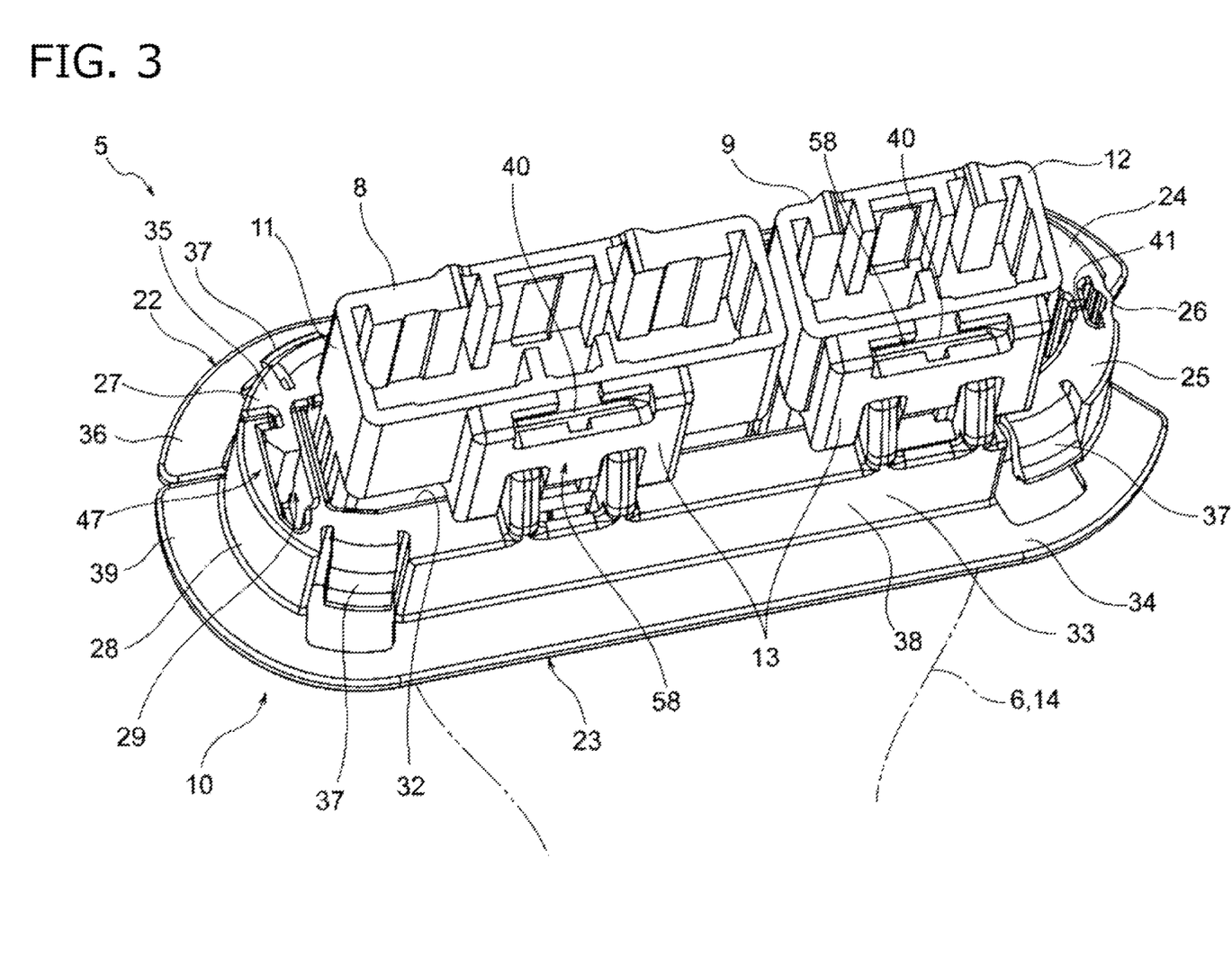
FIG. 3 is a perspective view of a connector.
Figure 4:
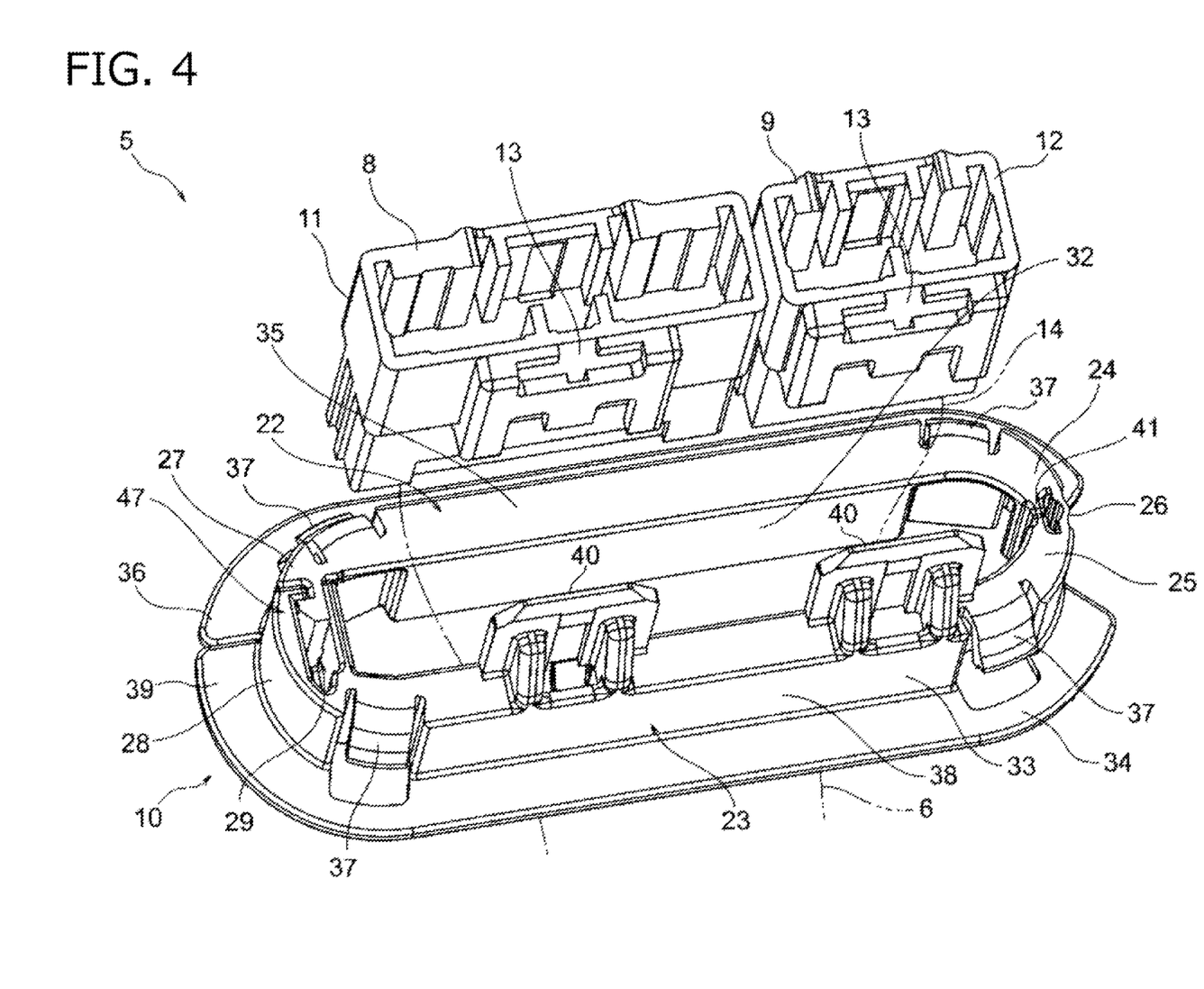
FIG. 4 is an exploded perspective view of the connector.
Figure 5:
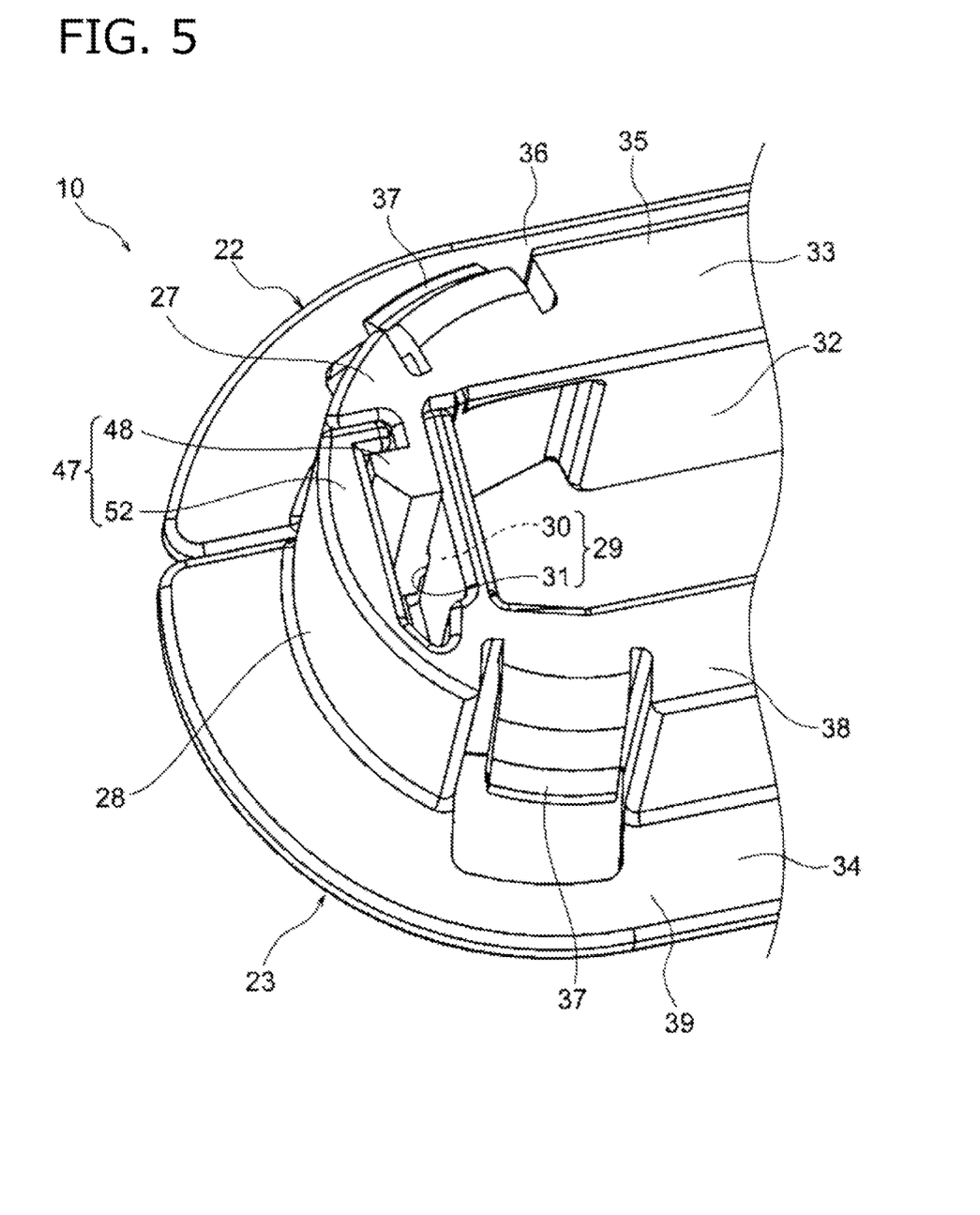
FIG. 5 is an enlarged view of the other end of a first divided inner part and the other end of a second divided inner part.
Figure 6A:
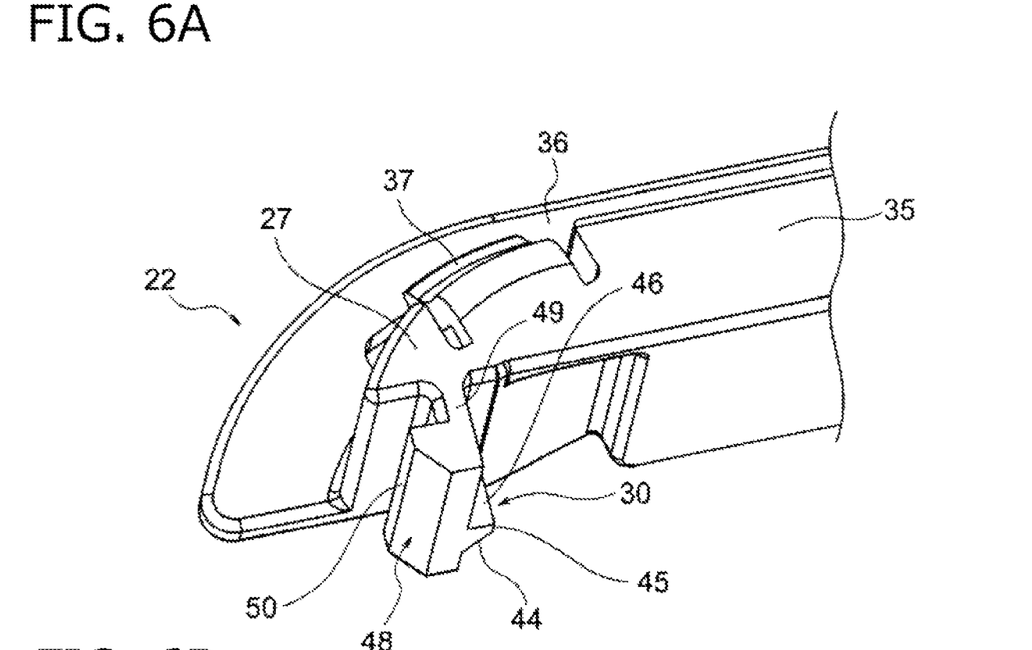
FIG. 6A is an enlarged view of the other end of the first divided inner part and FIG. 6B is an enlarged view of the other end of the second divided inner part.
Figure 6B:
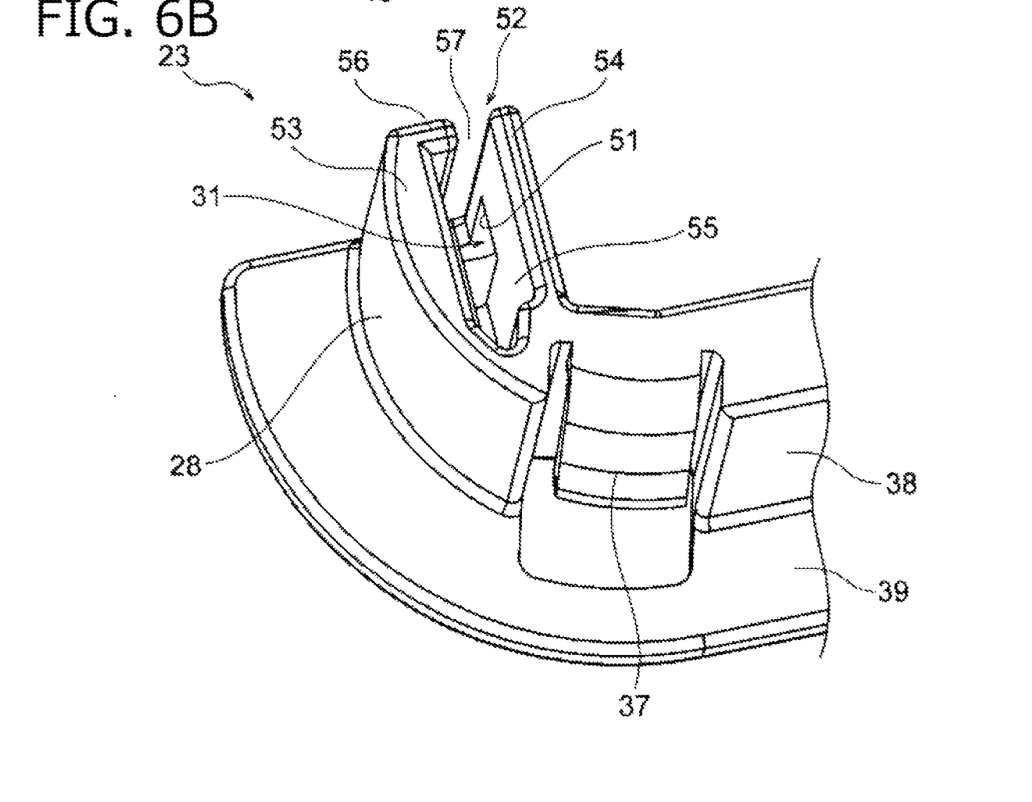
Figure 7:
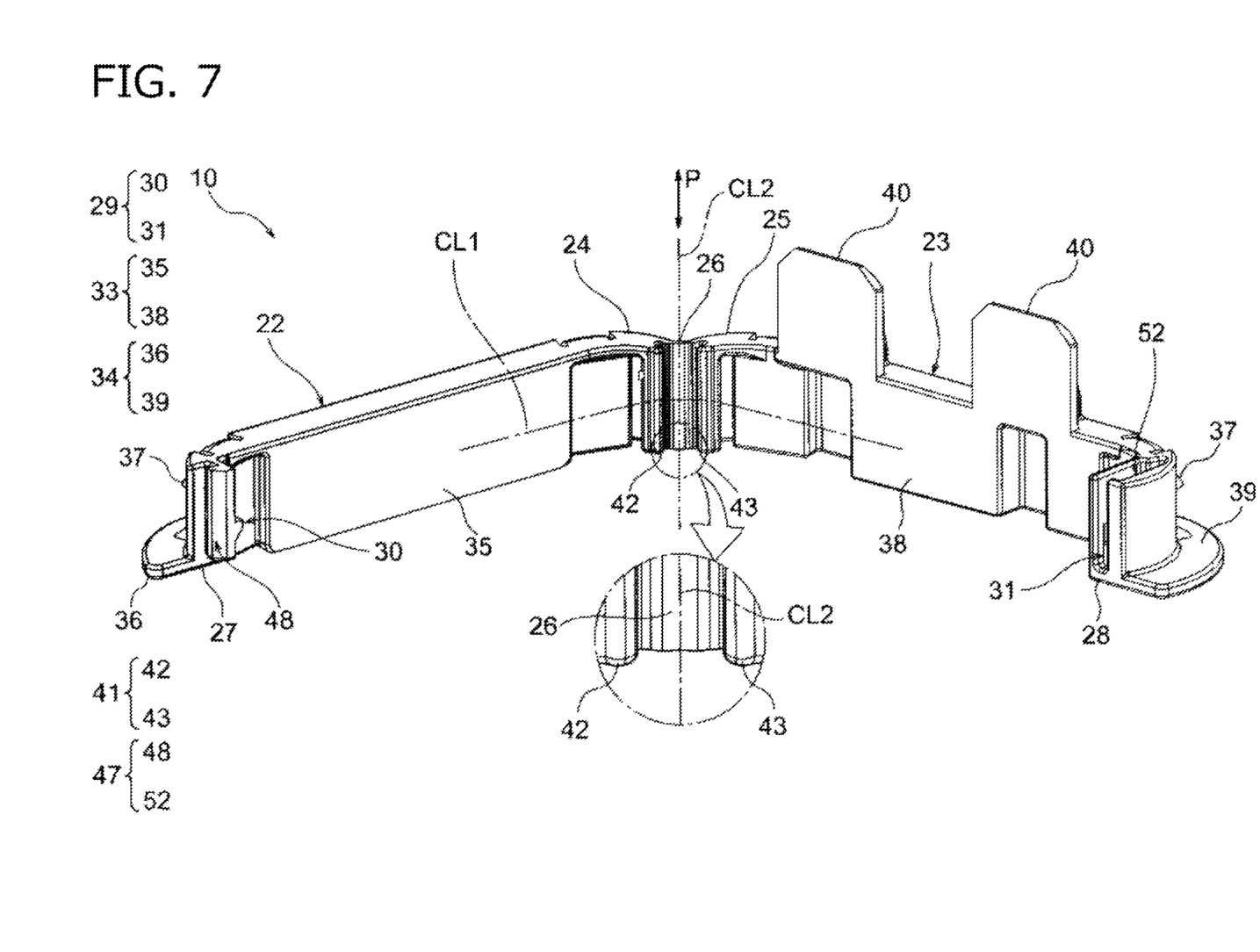
FIG. 7 is a perspective view of an inner member before the other end of the first divided inner part and the other end of the second divided inner part are fitted to each other.
Figure 8:
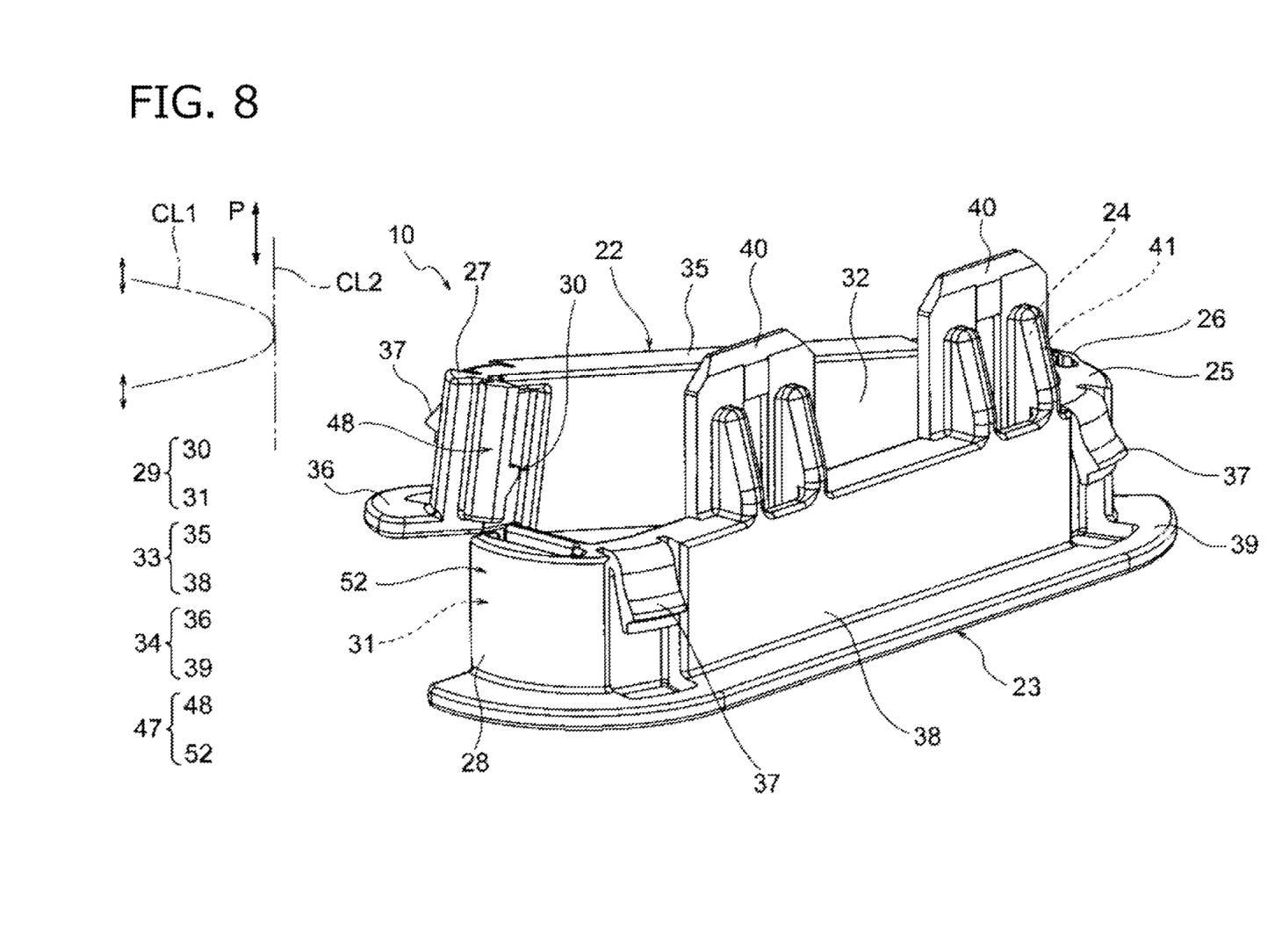
FIG. 8 is a perspective view showing a state in which the other end of the first divided inner part and the other end of the second divided inner part start to be fitted to each other by sliding movement.

Hereinafter, an embodiment will be described with reference to the drawings. FIG. 1 is an overall view showing an embodiment of a wire harness and a waterproof structure according to the present disclosure. FIG. 2 is a cross-sectional view taken along a line A-A in FIG. 1, and FIGS. 3 and 4 are a perspective view and an exploded perspective view of a connector. FIG. 5 is an enlarged view of the other end of a first divided inner part and the other end of a second divided inner part, FIG. 6A is an enlarged view of the other end of the first divided inner part, and FIG. 6B is an enlarged view of the other end of the second divided inner part. FIG. 7 is a perspective view of an inner member before the other end of the first divided inner part and the other end of the second divided inner part are fitted to each other, and FIG. 8 is a perspective view showing a state in which the other end of the first divided inner part and the other end of the second divided inner part start to be fitted to each other by sliding movement.

Wire Harness 1

In FIG. 1, a wire harness 1 is wired, for example, through an opening and closing position of a door portion of an automobile. The wire harness 1 that is wired in this way requires a waterproof structure 4 in order to waterproof an attachment hole 3 of a panel 2 (see FIG. 2). The wire harness 1 includes a connector 5 on one end side, a connector (not shown) on the other end side, a plurality of electric wires 6, and a grommet 7 for waterproofing. The wire harness 1 is connected to a mating connector (not shown) of a vehicle body via the connector 5 on the one end side, and is connected to a connector (a device) (not shown) on a door portion side via a connector (not shown) on the other end side. In the wire harness 1, the connector 5 on the one end side is disposed to as to be aligned with the attachment hole 3 of the panel 2, and the grommet 7 is provided to prevent moisture from entering inside of the panel 2 from the attachment hole 3.

Connector 5 and Electric Wire 6

In FIGS. 1, 3 and 4, the connector 5 includes terminal fittings (not shown) provided at terminals of the plurality of electric wires 6, connector housings 8, 9 in which the terminal fittings are accommodated, and an inner member 10 disposed outside the connector housings 8, 9. The connector housings 8, 9 are resin molded products and include a plurality of terminal accommodating chambers and mating connector fitting portions 11, 12. The mating connector fitting portions 11, 12 are each formed in a hood shape (a tubular shape), and the mating connector (not shown) is inserted into the mating connector fitting portions 11, 12. Housing side fixing portions 13, 13 common to the connector housings 8, 9 are formed on outer sides the mating connector fitting portions 11, 12. The housing side fixing portions 13, 13 are each formed in, for example, a frame shape and a recessed shape as shown in the drawings as fixing portions of the inner member 10 to inner side fixing portions 40, 40 described later. The housing side fixing portions 13, 13 move in an upper-lower direction (an arrow P) along a second axis CL2 described later, whereby the inner side fixing portions 40, 40 each having a protruding shape are inserted into the housing side fixing portions 13, 13, and a fixed state (a fixing portion 58) is formed by the insertion. The inner member 10 will be described later.

Each of the plurality of electric wires 6 includes a conductor and an insulator covering the conductor. Here, a general thin electric wire for low voltage is adopted as each of the plurality of electric wires 6. Since the terminal fittings (not shown) are respectively accommodated in the terminal accommodating chambers, the plurality of electric wires 6 are drawn out from rear portions of the connector housings 8, 9. When a portion immediately after being drawn out from the rear portions of the connector housings 8, 9 is referred to as a drawn-out portion 14, the drawn-out portion 14 is accommodated in a one end side tubular portion 15 described later of the grommet 7. The plurality of electric wires 6 are formed into a bundle shape after the drawn-out portion 14 is formed, and the bundle shape portion is accommodated in an intermediate tubular portion 17 described later of the grommet 7.

Grommet 7

In FIGS. 1 and 2, the grommet 7 is, for example, an elastic body made of rubber, and is formed in a shown shape by including a one end side tubular portion 15, the other end side tubular portion 16, and an intermediate tubular portion 17 disposed therebetween. The one end side tubular portion 1 is formed in a portion that is assembled to the connector 5 on the one end side and is in close contact with one opening edge portion of the attachment hole 3 of the panel 2. The one end side tubular portion 15 is also formed in the portion in which the drawn-out portion 14 of the plurality of electric wires 6 is accommodated. The attachment hole 3 according to the present embodiment is formed as an oval through hole having a pair of straight portions and a pair of arc portions. The one end side tubular portion 15 is formed in a shown shape by including a panel close contact portion 18 that is in close contact with the one opening edge portion, a flange assembly portion 19 that is assembled to a flange 34 described later, and an electric wire accommodating dome portion 20 that accommodates the drawn-out portion 14. The panel close contact portion 18 is formed in a shape that is easily elastically deformed and easily comes into close contact. The flange assembly portion 19 is formed to have a concave-shaped cross section. The electric wire accommodating dome portion 20 is formed to have a U-shaped cross section. Since the attachment hole 3 has an oval shape, the electric wire accommodating dome portion 20 is formed in a shape in which side portions 21 corresponding to the pair of straight portions are relatively long in a grommet axial direction.

The other end side tubular portion 16 is formed in a shape obtained by reducing a size of the one end side tubular portion 15 in the present embodiment. Similarly to the one end side tubular portion 15, the other end side tubular portion 16 includes a panel dose contact portion, a flange assembly portion and an electric wire accommodating dome portion (reference numerals of the portions are omitted). The other end side tubular portion 16 is disposed so as to open in a direction opposite to the one end side tubular portion 15 in the present embodiment. The intermediate tubular portion 17 between the other end side tubular portion 16 and the one end side tubular portion 15 is formed in a bellows tube shape having a circular cross section. The intermediate tubular portion 17 is formed so as to be freely bendable and stretchable. The intermediate tubular portion 17 may be referred to as a small diameter portion, and the other end side tubular portion 16 and the one end side tubular portion 15 may be referred to as large diameter portions.

Inner Member 10

In FIGS. 2, 3, 4 and 7, the inner member 10 is a resin molded product, and is formed in a shown shape including a first divided inner part 22 and a second divided inner part 23, a hinge 26 that connects one end 24 of the first divided inner part 22 and one end 25 of the second divided inner part 23 to each other, and a first lock portion 30 and a second lock portion 31 formed on a fitting portion (a lock portion 29) between the other end 27 of the first divided inner part 22 and the other end 28 of the second divided inner part 23. The inner member 10 is disposed outside the connector housings 8, 9. As can be seen from shapes of the first divided inner part 22 and the second divided inner part 23, the inner member 10 is formed to have a two-divided structure. The inner member 10 is a member having a substantially oval and annular shape, and is formed so as to be divided into two in a major axis direction. Since the inner member 10 has a substantially oval and annular shape, the housing accommodating portion 32 is formed inside an inner member main body 33 as a penetrating portion corresponding to the connector housings 8, 9. In the inner member 10, an annular plate-shaped flange 34 is formed on an outer side of the inner member main body 33 as an assembly destination of the grommet 7.

As shown in FIG. 7, an axis along a connecting direction of the first divided inner part 22 and the second divided inner part 23 by the hinge 26 is defined as a first axis CL1. Similarly, as shown in FIG. 7, an axis along a width direction of the hinge 26 is defined as a second axis CL2 (the second axis CL2 is orthogonal to the first axis CL1). An arrow P parallel to the second axis CL2 is defined as the upper-lower direction. Hereinafter, the above portions of the inner member 10 will be described.

First Divided Inner Part 22

In FIGS. 3 to 7, the first divided inner part 22 is one member obtained by dividing the substantially oval and annular inner member 10 into two in the major axis direction. The first divided inner part 22 includes a first main body 35 constituting the inner member main body 33 and a first flange 36 constituting the flange 34. Two panel engaging portions 37 are formed on an outer side of the first main body 35. The two panel engaging portions 37 are formed at portions that pass through the attachment hole 3 of the panel 2 (see FIG. 2) and are hooked by the other opening edge portion. The two panel engaging portions 37 are disposed on sides of the one end 24 and the other end 27 of the first divided inner part 22. The first flange 36 is formed on a convex portion such that the concave flange assembly portion 19 of the grommet 7 is assembled. In the first flange 36, a cutout portion is formed on the side of the one end 24 of the first divided inner part 22 (a reference numeral is omitted). In the first flange 36, cutout portions for mold removal are formed at positions corresponding to the two panel engaging portions 37 (reference numerals are omitted).

Second Divided Inner Part 23

In FIGS. 3 to 7, the second divided inner part 23 is the other member obtained by dividing the substantially oval and annular inner member 10 into two in the major axis direction. The second divided inner part 23 includes a second main body 38 constituting the inner member main body 33 and a second flange 39 constituting the flange 34. Similarly to the first divided inner part 22, two panel engaging portions 37 are formed on an outer side of the second main body 38. The two panel engaging portions 37 are formed at portions that pass through the attachment hole 3 of the panel 2 (see FIG. 2) and are hooked by the other opening edge portion. The two panel engagement portions 37 are disposed on sides of the one end 25 and the other end 28 of the second divided inner part 23. Inner side fixing portions 40, 40 are formed on an upper side of the second main body 38. The inner side fixing portions 40, 40 are each formed in a convex shape as fixing portions to housing side fixing portions 13, 13. The inner side fixing portions 40, 40 and the housing side fixing portions 13, 13 have a known fitting structure (an engagement structure and a locking structure). Similarly to the first divided inner part 22, the second flange 39 is formed on a convex portion such that the concave flange assembly portion 19 of the grommet 7 is assembled. In the second flange 39, similarly to the first divided inner part 22, a cutout portion is formed on the side of the one end 25 of the second divided inner part 23 (a reference numeral is omitted). In the second flange 39, cutout portions for mold removal are formed at positions corresponding to the two panel engaging portions 37 (reference numeral are omitted).

Hinge 26 and Stopper Portion 41

In FIGS. 3, 4, and 7, the hinge 26 is formed as a thin and deformable portion that connects the one end 24 of the first divided inner part 22 and the one end 25 of the second divided inner part 23 to each other. The hinge 26 is formed in a shape that is short in a direction along the first axis CL1 and long in the width direction along the second axis CL2. The hinge 26 is formed not only to be bendable so as to be folded about the second axis CL2 but also to be bendable so as to be twisted about the first axis CL1. That is, the hinge 26 is formed such that the first divided inner part 22 and the second divided inner part 23 can be brought into a state shown in FIG. 8 by the above twisting bending. The above "twisting" is relatively small since the hinge 26 has the shape that is short in the direction along the first axis CL1 and long in the width direction along the second axis CL2 (A twisting angle at this time is an acute angle. A hinge having a narrow width may be twisted to a large extent as to rotate, but here, it is sufficient to twist the hinge to such an extent that the hinge can be brought into the state of FIG. 8. Although detailed description is omitted, it can be said that workability is high if the twisting angle can be regulated.).

A stopper portion 41 includes a first stopper portion 42 protruding from the one end 24 of the first divided inner part 22 and a second stopper portion 43 protruding from the one end 25 of the second divided inner part 23. The stopper portion 41 is disposed inward than the hinge 26. The stopper portions 41 are respectively formed on protrusions whose tip ends can abut on each other when the other end 27 of the first divided inner part 22 and the other end 28 of the second divided inner part 23 are fitted to each other. As a matter of course, the first stopper portion 42 and the second stopper portion 43 have an advantage in that when the tip ends abut on each other, positions of the other end 27 and the other end 28 are easily determined during the fitting, and thus smooth fitting can be performed.

First Lock Portion 30 and First Opening Regulating Portion 48

In FIGS. 5 to 7, the first lock portion 30 constituting the lock portion 29 is formed on a fitting portion disposed at the other end 27 of the first divided inner part 22. The first lock portion 30 is formed integrally with a first opening regulating portion 48 described later. The first lock portion 30 is disposed on a lower side of an inner surface of the first opening regulating portion 48. The first lock portion 30 is formed as a claw-shaped portion having a tapered surface 44 (see FIGS. 6A and 6B), a protruding tip end surface 45 and a fitting surface 46. The first lock portion 30 is formed as a claw-shaped protruding portion to be fitted to the second lock portion 31 when the first lock portion 30 slides and moves in accordance with the twisting of the hinge 26 (described later).

The first opening regulating portion 48 is formed as a portion constituting an opening regulating portion 47 together with a second opening regulating portion 52 described later. The opening regulating portion 47 is disposed in vicinity of the lock portion 29. The opening regulating portion 47 is formed as a portion that regulates opening between the other end 27 of the first divided inner part 22 and the other end 28 of the second divided inner part 23 that attempt to rotate about the second axis CL2 after fitting of the lock portion 29. The first opening regulating portion 48 is formed in a shown shape by including a wall-shaped portion 49 protruding from the other end 27 of the first divided inner part 22 (the other end of the first main body 35), and a protruding portion 50 formed on an outer surface of the wall-shaped portion 49. The first lock portion 30 is disposed and formed on an inner surface of the wall portion 49 of the first opening regulating portion 48. The first opening regulating portion 48 is also formed on a portion having a shape that the first opening regulating portion 48 and the second opening regulating portion 52 described later guide each other, when the other end 27 of the first divided inner part 22 and the other end 28 of the second divided inner part 23 are fitted to each other.

Second Lock Portion 31 and Second Opening Regulating Portion 52

In FIGS. 5 to 7, the second lock portion 31 constituting the lock portion 29 is formed on a fitting portion disposed at the other end 28 of the second divided inner part 23. The second lock portion 31 is disposed on a lower side of an inner wall portion 54 of the second opening regulating portion 52 described later, and is formed as a recessed portion (a hole portion) penetrating the inner portion 54 in a rectangular shape. An upper side of the rectangular recessed portion (the hole portion) of the second lock portion 31 is formed as a fitting portion 51 that hooks the fitting surface 46 of the first lock portion 30. The second lock portion 31 is formed as the recessed portion to be fitted to the first lock portion 30 when the second lock portion 31 slides and moves in accordance with the twisting of the hinge 26 (described later).

The second opening regulating portion 52 is formed as a portion constituting the opening regulating portion 47 together with the first opening regulating portion 48. The second opening regulating portion 52 is formed in a shown shape by including an outer wall portion 53 and the inner wall portion 54 disposed at the other end 28 of the second divided inner part 23, an accommodating space 55 between the outer wall portion 53 and the inner wall portion 54, and a protruding portion 56 and a slit 57 facing the other end 27 of the first divided inner part 22 (the other end of the first main body 35). The second opening regulating portion 52 is formed as the portion having a shape in which the protruding portion 50 of the first opening regulating portion 48 can be inserted thereinto and held. The second opening regulating portion 52 is also formed as the portion having the shape in which the second opening regulating portion 52 and the first opening regulating portion 48 can guide each other.

Assembly Process of Connector 5

In FIG. 4, the connector housings 8, 9 and the inner member 10 disposed so as to surround the drawn-out portions 14 of the plurality of electric wires 6 drawn out from the rear portions of the connector housings 8, 9 are moved in the upper-lower direction (the arrow P) along the second axis and thereafter, the housing side fixing portions 13, 13 and the inner side fixing portions 40, 40 are fitted to each other to form the fixing portion 58. Thereby, assembly of the connector 5 is completed as shown in FIG. 3.

The inner member 10 is first opened as shown in FIG. 7 around the drawn-out portion 14 of the plurality of electric wires 6. That is, the first divided inner part 22 and the second divided inner part 23 are opened by rotating about the second axis CL2 at a position of the hinge 26. Next, the first divided inner part 22 and the second divided inner part 23 are integrated so as to surround the drawn-out portion 14, thereby forming the inner member 10 as shown in FIG. 4. At this time, an open state is not changed to a closed state as in the related-art example (see FIGS. 10A to 10C), but is changed to a state shown in FIG. 8. That is, by twisting the hinge 26 about the first axis CL1 (see FIG. 7), the other end 27 of the first divided inner part 22 and the other end 28 of the second divided inner part 23 are fitted to each other by sliding movement (sliding movement similar to movement in the upper-lower direction (the arrow P) along the second axis CL2) in accordance with the twisting. The fitting is completed when the first opening regulating portion 48 and the second opening regulating portion 52 guide each other and the first lock portion 30 and the second lock portion 31 hook each other in the upper-lower direction. In this fitting, a fitting backlash as in the related art does not occur, and since the opening regulating portion 47 (the first opening regulating portion 48 and the second opening regulating portion 52) is provided, the other end 27 of the first divided inner part 22 and the other end 28 of the second divided inner part 23 do not open as in the related art.

Effects

As described above with reference to FIGS. 1 to 8, according to the wire harness 1 of the embodiment of the present disclosure, by twisting the hinge 26, the other end 27 of the first divided inner part 22 and the other end 28 of the second divided inner part 23 are fitted to each other by sliding movement in accordance with the twisting, so that occurrence of a fitting backlash, which causes the other ends 27, 28 to open as in the related art, can be prevented. As a result, a close contact state of the grommet 7 with the one opening edge portion of the attachment hole 3 of the panel 2 can be stabilized. Therefore, according to the wire harness 1, waterproof performance can be improved as compared with the related art. Thereby, the waterproof structure 4 also has an effect of being able to improve the waterproof performance as compared with the related art.

Here, the details of the above embodiments are summarized as follows. Aspect of non-limiting embodiments of the present disclosure relates to a wire harness includes: a connector that is disposed so as to be aligned with an attachment hole of a panel; and a grommet that is assembled to the connector and is in close contact with one opening edge portion of the attachment hole. The connector includes a connector housing from Which a plurality of electric wires are drawn out, and an inner member having a two-divided structure that includes an annular plate-shaped flange to which the grommet is assembled, and that is disposed outside the connector housing. The inner member includes a first divided inner part and a second divided inner part, a thin and deformable hinge that connects one end of the first divided inner part and one end of the second divided inner part to each other, and a lock portion that is formed as a fitting portion between the other end of the first divided inner part and the other end of the second divided inner part. When an axis along a connecting direction of the first divided inner part and the second divided inner part by the hinge is defined as a first axis, by twisting the hinge about the first axis, the lock portion is formed as a portion where the other end of the first divided inner part and the other end of the second divided inner part are fitted to each other by sliding movement in accordance with the twisting.

According to the present disclosure above, by twisting the hinge, the other end of the first divided inner part and the other end of the second divided inner part are fitted to each other by sliding movement in accordance with the twisting, so that occurrence of a fitting backlash, which causes the other ends to open as in the related art, can be prevented. As a result, a close contact state of the grommet with the one opening edge portion of the attachment hole of the panel can be stabilized. Therefore, according to the present disclosure, waterproof performance can be improved as compared with the related art.

According to an aspect of the present disclosure, there is provided that when an axis along a width direction of the hinge is defined as a second axis orthogonal to the first axis, an opening regulating portion, which regulates opening between the other end of the first divided inner part and the other end of the second divided inner part that attempt to rotate about the second axis after fitting of the lock portion, is formed in vicinity of the lock portion.

According to the present disclosure above, the opening regulating portion is formed in the vicinity of the lock portion, and the opening regulating portion regulates the opening between the other end of the first divided inner part and the other end of the second divided inner part that attempt to rotate about the second axis after the fitting of the lock portion, so that occurrence of a state similar to the fitting backlash, which causes the other ends to open as in the related art, can be prevented. Therefore, according to the present disclosure, the close contact state of the grommet can be stabilized.

According to an aspect of the present disclosure, there is provided that the opening regulating portion is also formed on a portion that guides the other end of the first divided inner part and the other end of the second divided inner part each other during the sliding movement of the other end of the first divided inner part and the other end of the second divided inner part.

According to the present disclosure above, the opening regulating portion also has a guide function, so that the other end of the first divided inner part and the other end of the second divided inner part can smoothly slide and move when the lock portion is fitted. According to the present disclosure, workability can be improved.

According to an aspect of the present disclosure, there is provided that the one end of the first divided inner part and the one end of the second divided inner part are respectively provided with stopper portions that are disposed inward than the hinge and whose tip ends can abut on each other when the other end of the first divided inner part and the other end of the second divided inner part are fitted to each other.

According to the present disclosure above, not only the one end of the first divided inner part and the one end of the second divided inner part are connected by the thin deformable hinge but also the stopper portions whose the tip ends can abut on each other are formed, stability of the fitting and a shape stability of the inner member can be enhanced.

According to an aspect of the present disclosure, there is provided that the connector housing and the inner member are provided with fixing portions that are fixed to each other by movement along the second axis after fitting of the lock portion.

According to the present disclosure above, a structure is adopted in which the inner member and the connector housing are moved along the second axis and are fixed to each other by the fixing portions, so that the other end of the first divided inner part and the other end of the second divided inner part can be fitted to each other by twisting of the hinge and sliding movement. In the present disclosure, the connector housing is not attached while an outer side thereof being surrounded as in the related art, and therefore, the fitting can be easily performed.

According to an aspect of the present disclosure, there is provided a waterproof structure includes: a panel having an attachment hole; a connector that is disposed so as to be aligned with the attachment hole; and a grommet that is assembled to the connector and is in close contact with one opening edge portion of the attachment hole. The connector includes a connector housing from which a plurality of electric wires are drawn out, and an inner member having a two-divided structure that includes an annular plate-shaped flange to which the grommet is assembled, and that is disposed outside the connector housing. The inner member includes a first divided inner part and a second divided inner part, a thin and deformable hinge that connects one end of the first divided inner part and one end of the second divided inner part to each other, and a lock portion that is formed on a fitting portion between the other end of the first divided inner part and the other end of the second divided inner part. When an axis along a connecting direction of the first divided inner part and the second divided inner part by the hinge is defined as a first axis, by twisting the hinge about the first axis, the lock portion is formed on a portion where the other end of the first divided inner part and the other end of the second divided inner part are fitted to each other by sliding movement in accordance with the twisting.

According to the present disclosure above, by twisting the hinge, the other end of the first divided inner part and the other end of the second divided inner part are fitted to each other by sliding movement in accordance with the twisting, so that occurrence of a fitting backlash, which causes the other ends to open as in the related art, can be prevented. As a result, a close contact state of the grommet with the one opening edge portion of the attachment hole of the panel can be stabilized. Therefore, according to the present disclosure, waterproof performance can be improved as compared with the related art.

It goes without saying that various modifications can be made out without departing from the gist of the present disclosure.

What is claimed is:

1. A wire harness comprising:
   a connector disposed so as to be aligned with an attachment hole of a panel; and
   a grommet assembled to the connector and being in close contact with one opening edge portion of the attachment hole,
   wherein the connector includes:
      a connector housing from which a plurality of electric wires are drawn out; and
      an inner member, having a two-divided structure that includes an annular plate-shaped flange to which the grommet is assembled, disposed outside the connector housing;
   wherein the inner member includes a first divided inner part and a second divided inner part, a deformable hinge that connects one end of the first divided inner part and one end of the second divided inner part to each other, and a lock portion that is formed on a fitting portion between an other end of the first divided inner part and an other end of the second divided inner part; and
   wherein the lock portion is formed on a portion where the other end of the first divided inner part and the other end of the second divided inner part are fitted to each other by sliding movement in accordance with a twisting in which the hinge is twisted about a first axis, the first axis extending along a connecting direction of the first divided inner part and the second divided inner part by the hinge,
   wherein the electric wires are drawn out along the first axis, and
   wherein the lock portion comprises a plurality of grooves configured to lock motion of the other end of the first divided part and the other end of the second divided part in both the first axis in which the hinge is twisted and about a second axis that is perpendicular to the first axis.

2. The wire harness according to claim 1,
   wherein an opening regulating portion, which regulates opening between the other end of the first divided inner part and the other end of the second divided inner part about the second axis after fitting of the lock portion, is formed in vicinity of the lock portion, the second axis extending along a width direction of the hinge and being orthogonal to the first axis.

3. The wire harness according to claim 2,
   wherein the opening regulating portion is also formed on a portion that guides the other end of the first divided inner part and the other end of the second divided inner part each other during the sliding movement of the other end of the first divided inner part and the other end of the second divided inner part.

4. The wire harness according to claim 3,
   wherein the one end of the first divided inner part and the one end of the second divided inner part are respectively provided with stopper portions that are disposed inward than the hinge and having tip ends that are configured to abut on each other when the other end of the first divided inner part and the other end of the second divided inner part are fitted to each other.

5. The wire harness according to claim 3,
   wherein the connector housing and the inner member are provided with fixing portions that are fixed to each other by movement along the second axis after fitting of the lock portion.

6. A waterproof structure comprising:
   a panel having an attachment hole;
   a connector disposed so as to be aligned with the attachment hole; and
   a grommet assembled to the connector and being in close contact with one opening edge portion of the attachment hole,
   wherein the connector includes:
      a connector housing from which a plurality of electric wires are drawn out; and
      an inner member having a two-divided structure that includes an annular plate-shaped flange to which the grommet is assembled, and that is disposed outside the connector housing;
   wherein the inner member includes a first divided inner part and a second divided inner part, a deformable hinge that connects one end of the first divided inner part and one end of the second divided inner part to each other, and a lock portion that is formed on a fitting portion between an other end of the first divided inner part and an other end of the second divided inner part; and
   wherein the lock portion is formed on a portion where the other end of the first divided inner part and the other end of the second divided inner part are fitted to each other by sliding movement in accordance with a twisting in which the hinge is twisted about a first axis, the first axis extending along a connecting direction of the first divided inner part and the second divided inner part by the hinge,
   wherein the electric wires are drawn out along the first axis, and
   wherein the lock portion comprises a plurality of grooves configured to lock motion of the other end of the first divided part and the other end of the second divided part in both the first axis in which the hinge is twisted and about a second axis that is perpendicular to the first axis.

* * * * *